UNITED STATES PATENT OFFICE.

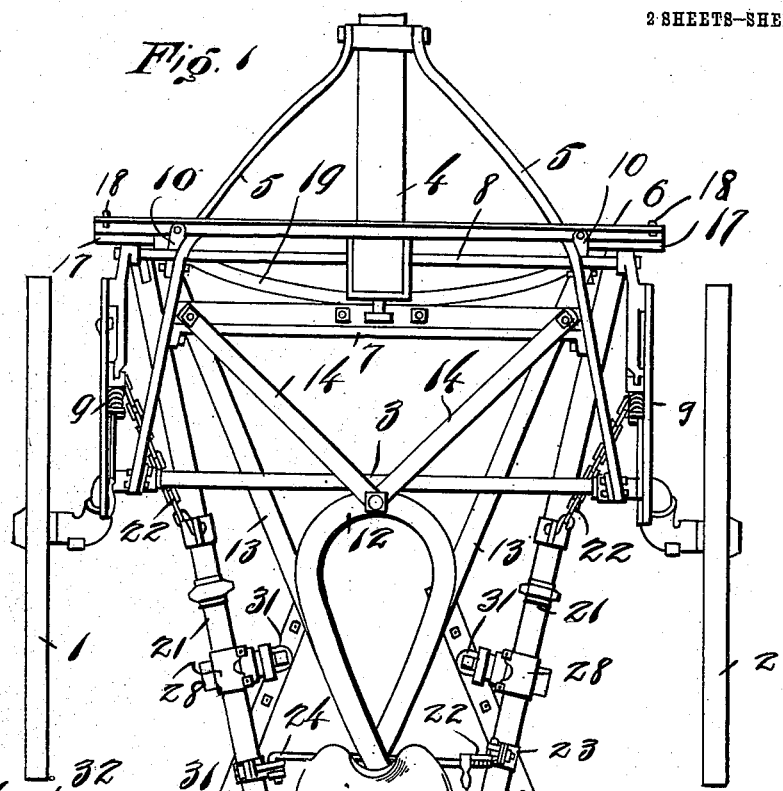

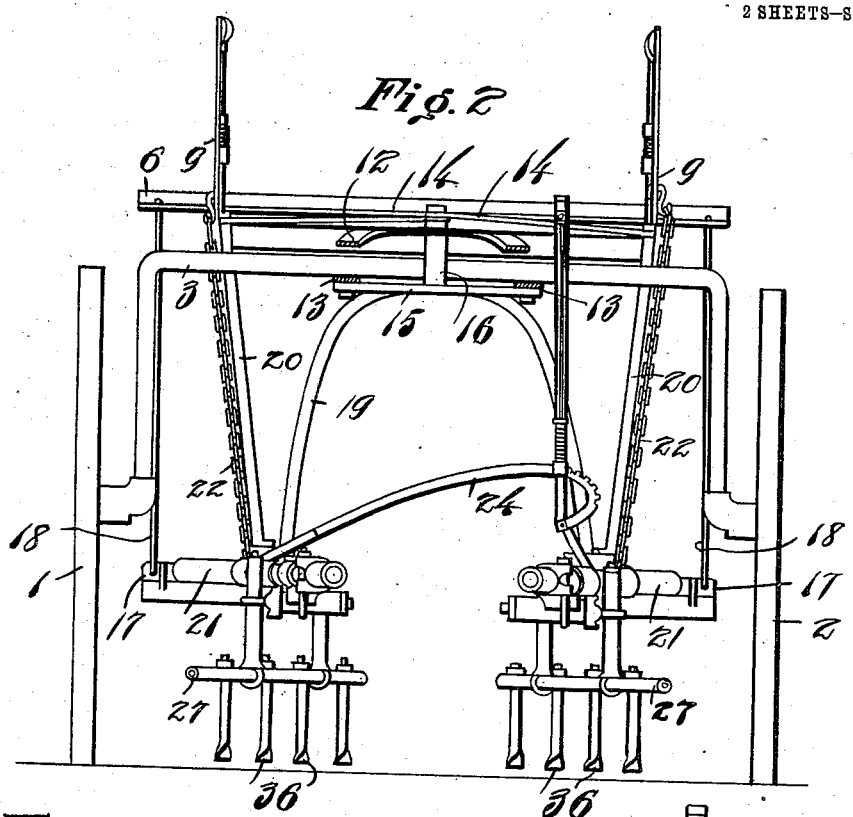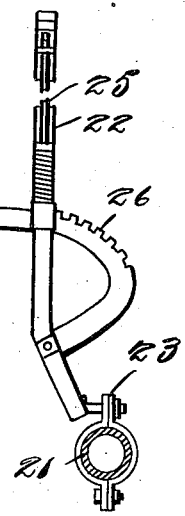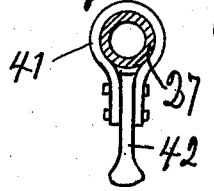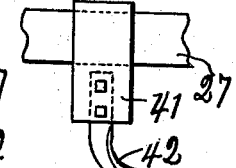
S. A. COWART.
HARROW ATTACHMENT FOR CULTIVATORS.
APPLICATION FILED MAY 12, 1911.
1,014,124.
Patented Jan. 9, 1912.
2 SHEETS—SHEET 2.

STEPHEN A. COWART, OF MIDLOTHIAN, TEXAS, ASSIGNOR OF ONE-HALF TO J. P. KIMMEL, OF MIDLOTHIAN, TEXAS.

HARROW ATTACHMENT FOR CULTIVATORS.

1,014,124.  Specification of Letters Patent.  Patented Jan. 9, 1912.

Application filed May 12, 1911. Serial No. 626,807.

*To all whom it may concern:*

Be it known that I, STEPHEN A. COWART, a citizen of the United States, residing at Midlothian, in the county of Ellis and State of Texas, have invented certain new and useful Improvements in Harrow Attachments for Cultivators, of which the following is a specification.

My invention relates to cultivators and more particularly to attachments for cultivators, and the object is to provide attachments in the nature of harrows to be attached to the cultivators instead of the plows which are intended to be attached to the cultivators. The harrow teeth are to be made in the form of small plows so that the ground may be stirred over a larger area and left flat instead of in ridges like ground plowed or cultivated with the usual plows. With the use of such attachments it will not be necessary to plow the land so deep. The attachments are made interchangeable with the usual plows.

Other objects and advantages will be fully explained in the following description and the invention will be more particularly pointed out in the claims.

Reference is had to the accompanying drawings which form a part of this application.

Figure 1 is a plan view of a sufficient part of an "Oliver" cultivator to illustrate my invention, the improvements being attached to the cultivator. Fig. 2 is a rear elevation of the same, only enough of the cultivator being shown to illustrate the use of the improvements. Fig. 3 is a rear elevation of the lateral adjusting means on a larger scale. Fig. 4 is an enlarged view, partly in section, of one of the harrow attaching and adjusting devices. Fig. 5 is an enlarged bottom plan view of the adjusting sleeve. Fig. 6 is an enlarged rear elevation of the attaching devices. Figs. 7, 8, and 9 are detail views of a variation in the means for attaching the teeth or small plows to the harrow beams. Figs. 10 and 11 are detail views of a variation in the clamps for attaching plows or teeth to the harrow beams.

Similar characters of reference are used to indicate the same parts throughout the several views.

The principal parts of a cultivator are shown, including the wheels 1 and 2, arched axle 3, tongue 4, frame pieces 5 connected with the tongue 4 and axle 3, frame pieces 6 and 7 connected to frame pieces 5, fulcrum rod 8 for levers 9 connected to frame pieces 5 by shoes 10, seat 11 and support 12 with braces 13 and 14, the braces 14 being pivotally connected to support 12 by a bar 15 and upstanding pivot post 16. Fulcrum blocks 17 are supported by hanger rods 18 which are connected to bar 6 and by the arch bar 19 which is connected to the bar 7. The fulcrum blocks 17 are braced by the bars 20. The cultivator beams 21 are pivotally connected at their forward ends to the blocks 17 and are held at the proper elevation toward their rear ends by the chains 22 which are attached to the beams 21 and to the ratchet levers 9. The beams 21 are laterally adjusted by ratchet lever 22 which is attached to one of the beams 21 by clamps 23 and by ratchet bar 24 which is pivotally connected to the lever 22 and connected to one of the beams 21 by clamps 23, the bar 24 having teeth to be engaged by a spring-actuated dog 25 carried by lever 22. By means of the lever 22, the beams 21 can be adjusted laterally and held at any desirable adjustment by the ratchet teeth 26 and the dog 25.

The harrow beams 27 are carried by the beams 21 and are attached thereto by clamps 28 and U-bolts 29. These clamps 28 and U-bolts 29 carry tubular holders 30 in which are carried I-bolts 31. The harrow beams 27 are carried by the following members:—an I-bolt 32, a tubular clamping member 33, a flanged washer 34, and nut 35, and the tubular member 33 is carried by the I-bolt 31. As shown in Fig. 1, the I-bolt 31 may project on opposite sides of the beams 21 so that the harrow beams can be set at the desired angle. The tubular member 33 has a flattened mouth 36 to receive a portion of the eye of the I-bolt 32 so that the two elements of the clamp cannot turn or move relative to each other and also to form a clamping surface to press against the beam 27. The washer 34 has a tubular flange which fits down in the member 33 for the purpose of holding the I-bolt 32 centrally in the member 33. The tubular member 33 can be clamped rigidly to the beam 21 and the beam 27 can be rigidly clamped to the member 33. It is apparent that the harrow beams can be positioned parallel to either side of the beams 21.

The harrow teeth 36 may be inserted in the beams 27 as shown in Figs. 1, 2 and 4, or the teeth may be secured to the beams, as shown in Figs. 7, 8, and 9, that is by clamps 37 and nuts 38. The clamps 37 have shanks 39 which are rounded on the exterior so that the teeth or plows 36 can be set at any desired angle, the shanks 39 having elongated openings 40 for the upper ends of the teeth or plows. It is apparent that the teeth or plows 36 can be set at any desirable angle by loosening the nuts 35 and turning the beams 27.

In the variations shown in Figs. 10 and 11 the clamps 41 engage the plows or teeth 42 lengthwise instead of extending the shanks of the plows through the ends of the clamps.

Having fully described my invention, what I claim as new and desire to secure by Letters Patent, is,—

1. The combination of a cultivator having beams pivotally mounted at the forward ends and means for elevating the rear ends and holding the same at different adjustments and harrow attachments consisting of harrow beams, clamps for attaching said harrow beams to said cultivator beams whereby said harrow beams may be held at angles to or parallel with said cultivator beams, teeth carried by said harrow beams, and means for holding said harrow beams at different adjustments whereby said teeth may be set at different angles said means consisting of sleeves having the lower ends thereof flattened to form a bearing surface against the harrow beams, I-bolts engaging the harrow beams and extending through said sleeves, the eyes of said I-bolts being engaged by said flattened portions of the sleeves, washers having tubular flanges for holding said bolts centrally in said sleeves, and nuts for clamping said sleeves against said beams.

2. In a cultivator having beams pivotally mounted at their forward ends and means for holding the rear ends of said beams at different elevations, harrow beams provided with teeth, clamps for attaching said harrow beams to said cultivator beams at different angles, sleeves engaged by said clamps rigidly, and means for permitting the turning of said harrow beams and holding the same at different adjustments whereby said teeth may be set at different angles, said means consisting of flattened mouths formed on the lower ends of said sleeves, I-bolts engaging said harrow beams and extending through said sleeves, the eyes of the bolts being engaged by said flattened mouths, washers having tubular flanges projecting with said sleeves to hold said bolts centrally within said sleeves, nuts clamping said sleeves against said harrow beams, and means for adjusting said beams laterally and holding the same at different adjustments.

In testimony whereof, I set my hand in the presence of two witnesses, this 20th day of April, 1911.

STEPHEN A. COWART.

Witnesses:
R. J. LAWSON,
J. H. LAWSON.